United States Patent
Hansen et al.

(10) Patent No.: US 9,599,210 B2
(45) Date of Patent: Mar. 21, 2017

(54) DAMAGE MITIGATION FOR GEARBOX

(71) Applicant: Sikorsky Aircraft Corporation, Stratford, CT (US)

(72) Inventors: Eric K. Hansen, North Branford, CT (US); James Sullivan, Southington, CT (US); Anthony G. Chory, Trumbull, CT (US); JinKyu Choi, Trumbull, CT (US); Michael R. Robbins, Guilford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 14/073,162

(22) Filed: Nov. 6, 2013

(65) Prior Publication Data

US 2015/0122079 A1     May 7, 2015

(51) Int. Cl.
| | |
|---|---|
| *F16H 57/02* | (2012.01) |
| *F16H 57/032* | (2012.01) |
| *B64F 5/00* | (2006.01) |
| *C23C 24/04* | (2006.01) |

(Continued)

(52) U.S. Cl.
CPC ............ *F16H 57/02* (2013.01); *B64F 5/0081* (2013.01); *C23C 24/04* (2013.01); *F16H 57/032* (2013.01); *B22F 2003/248* (2013.01); *B64D 2045/009* (2013.01); *F16H 2057/02039* (2013.01); *Y10T 29/49622* (2015.01); *Y10T 29/49734* (2015.01); *Y10T 29/49737* (2015.01); *Y10T 74/2186* (2015.01)

(58) Field of Classification Search
CPC ......... Y10T 29/49737; Y10T 29/49734; Y10T 29/49732; Y10T 29/49746; B23P 6/002; B23P 6/005; B23P 6/007; B23P 6/045; B23P 6/00; B23P 6/04; C23C 24/04; F16H 57/02; F16H 57/032; F16H 2057/02039; B64F 5/0081; B64D 2045/009

See application file for complete search history.

(56) References Cited

U.S. PATENT DOCUMENTS

| | | | |
|---|---|---|---|
| 5,302,414 A | * | 4/1994 | Alkhimov et al. ........... 427/192 |
| 6,491,208 B2 | * | 12/2002 | James et al. .................. 228/119 |
| 6,905,728 B1 | | 6/2005 | Hu et al. |

(Continued)

FOREIGN PATENT DOCUMENTS

EP     2011964 B1     8/2011

OTHER PUBLICATIONS

Champagne, V.K. et al.; "Magnesium Repair by Cold Spray" U.S. Army Research Laboratory; May 2008; Fig. 2; p. 1, In 11-16, 20-24. Report No. ARL-TR-4438. Obtained online Aug. 3, 2015 URL=http://www.arl.army.mil/www/pages/374/magnesium.pdf.

(Continued)

*Primary Examiner* — Jason L Vaughan
(74) *Attorney, Agent, or Firm* — Cantor Colburn LLP

(57) ABSTRACT

A component of a rotary wing aircraft is provided including a surface configured to contact another component of the rotary wing aircraft such that the surface is susceptible to corrosion and/or pitting. The surface has an area from which a portion of material was removed. A structural deposit is formed by cold spraying one or more layers of powdered material within the area. The structural deposit is configured to carry a load applied to the component.

14 Claims, 7 Drawing Sheets

(51) Int. Cl.
 *B64D 45/00* (2006.01)
 *B22F 3/24* (2006.01)

(56) References Cited

U.S. PATENT DOCUMENTS

| | | | |
|---|---|---|---|
| 7,188,416 B1 * | 3/2007 | Woehlke et al. | 29/888.011 |
| 7,402,277 B2 | 7/2008 | Ayer et al. | |
| 7,455,881 B2 | 11/2008 | Raybould et al. | |
| 7,648,593 B2 | 1/2010 | Pandey | |
| 7,875,132 B2 | 1/2011 | Pandey | |
| 8,220,124 B1 * | 7/2012 | Morasch et al. | 29/402.09 |
| 8,231,936 B2 | 7/2012 | Song et al. | |
| 8,597,724 B2 * | 12/2013 | Bunting et al. | 427/142 |
| 2006/0090593 A1 | 5/2006 | Liu | |
| 2006/0093736 A1 | 5/2006 | Raybould et al. | |
| 2006/0134320 A1 * | 6/2006 | DeBiccari et al. | 427/140 |
| 2007/0269608 A1 * | 11/2007 | Saito et al. | 427/446 |
| 2009/0011123 A1 | 1/2009 | Bunting et al. | |
| 2009/0148622 A1 * | 6/2009 | Stoltenhoff et al. | 427/554 |
| 2009/0249603 A1 * | 10/2009 | Vargas | 29/402.18 |
| 2010/0143700 A1 | 6/2010 | Champagne et al. | |
| 2010/0143746 A1 | 6/2010 | Song et al. | |
| 2010/0155251 A1 | 6/2010 | Bogue et al. | |
| 2011/0030503 A1 | 2/2011 | Ehinger et al. | |
| 2013/0209826 A1 | 8/2013 | Ngo et al. | |
| 2014/0115854 A1 * | 5/2014 | Widener et al. | 29/402.18 |
| 2015/0063903 A1 * | 3/2015 | Matthews et al. | 403/267 |
| 2015/0125661 A1 | 5/2015 | Sullivan et al. | |

OTHER PUBLICATIONS

Notification of Transmittal of the International Search Report for the International Application No. PCT/US14/64259 dated Aug. 10, 2015; Mailed Aug. 21, 2015; 9 pages.

Written Opinion of the International Searching Authority for International Application No. PCT/US14/64259 dated Aug. 10, 2015; Mailed Aug. 21, 2015; 6 pages.

International Preliminary Report on Patentability; International Application No. PCT/US2014/064259; International Filing Date: Nov. 6, 2014; Date of Mailing: May 10, 2016; 7 Pages.

International Search Report and Written Opinion regarding related PCT Application No. PCT/US14/64264; dated Aug. 27, 2015; 15 pgs.

* cited by examiner

DAMAGE MITIGATION FOR GEARBOX

BACKGROUND OF THE INVENTION

Exemplary embodiments of the invention relate to components of a rotary-wing aircraft susceptible to corrosion damage and, more particularly, to a method for preventing or reducing corrosion damage to such a component of a rotary-wing aircraft.

A rotary-wing aircraft includes components, such as gearboxes for example, typically constructed from aluminum and magnesium alloys. As a result of exposure of such components to the environment, these alloy materials are susceptible to both general corrosion and galvanic corrosion. For example, the presence of water or moisture on the outer surface of the component may cause corrosion and other environmental conditions, such as chemical fallout and saltwater for example, may exacerbate corrosion. Alternatively, electro-chemical incompatibility with adjacent components can lead to galvanic corrosion. Both corrosion modes cause the material of the component to deteriorate, thereby reducing the cross-section thickness thereof. In some instances, the component's effective cross-section may be excessively reduced such that the structural integrity of the component is compromised.

Conventional rotary-wing aircraft component repair methods allow for dimensional restoration of aluminum and magnesium structures using a variety of techniques including, but not limited to, epoxy bonding, plasma spray, high velocity oxygen fuel (HVOF) thermal spray and fusion welding for example. High temperature repair techniques may result in unacceptable component distortion and degrade the substrate material properties by over-aging or solutioning. Epoxy bonding can break or spall during service, allowing the environmental elements to attack the underlying material. Subsequent attacks on the material will deteriorate wall thickness such that the component is no longer usable. In addition, none of these repair methods result in the formation of a deposit suitable for carrying a load.

BRIEF DESCRIPTION OF THE INVENTION

According to one embodiment of the invention, a component of a rotary wing aircraft is provided including a surface configured to contact another component of the rotary wing aircraft such that the surface is susceptible to corrosion and/or pitting. The surface has an area from which a portion of material was removed. A structural deposit is formed by cold spraying one or more layers of powdered material within the area. The structural deposit is configured to carry a load applied to the component.

According to another embodiment of the invention, a method of rebuilding a damaged portion of a surface of a component is provided included forming an area in the surface by removing all material exhibiting localized corrosion and/or pitting and preparing the formed area. A structural deposit is created in the area and is integrally formed with the component. The structural deposit is configured to carry a load applied to the component. Excess material is removed from the structural deposit.

According to another embodiment of the invention, a method of preemptively forming a structural deposit in a surface of a component is provided included identifying a portion of the surface where damage is expected to occur to form an area. The identified portion is then prepared. A structural deposit is created in the identified portion and is integrally formed with the component. The structural deposit is configured to carry a load applied to the component. Excess material is removed from the structural deposit.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
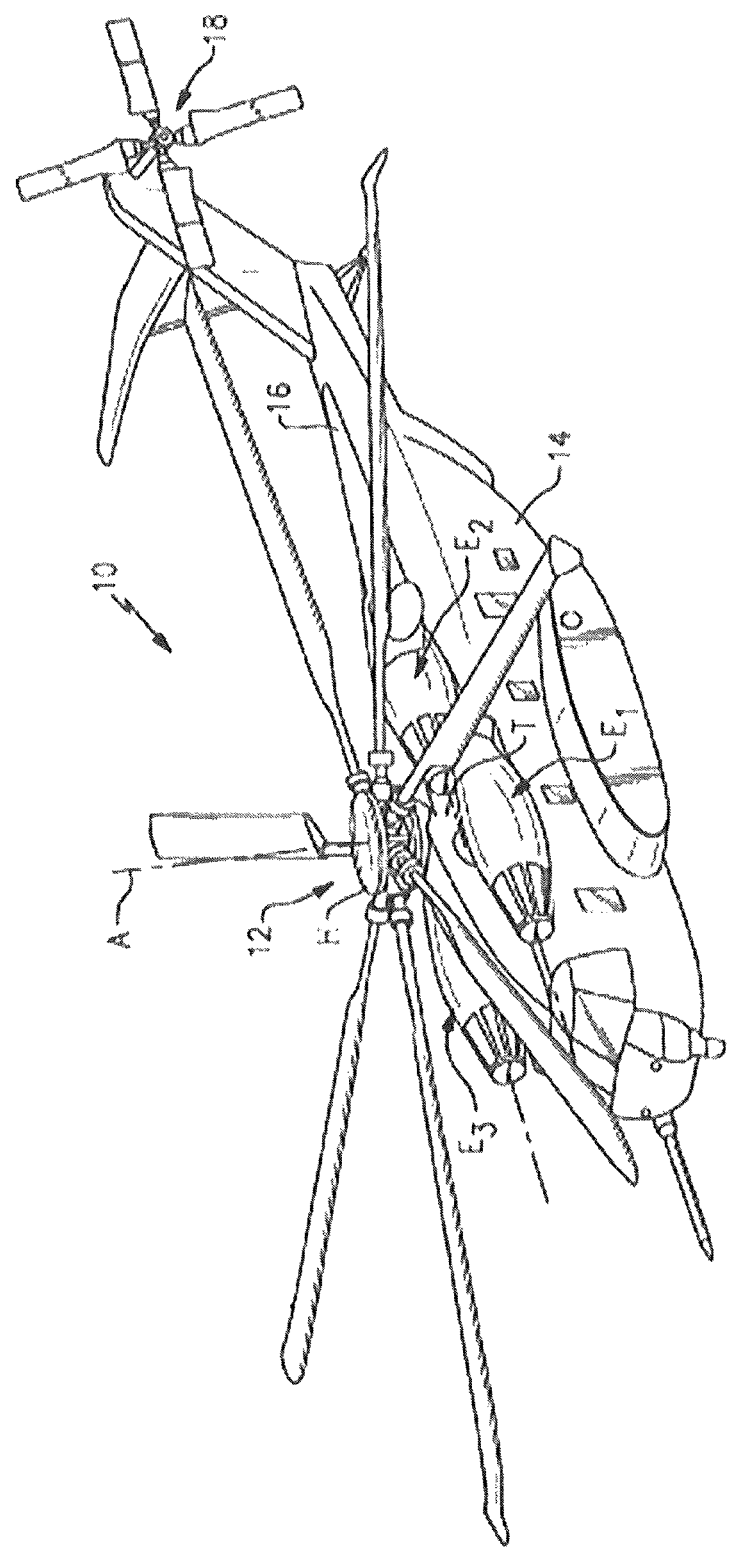
FIG. 1 is a perspective view of an exemplary rotary wing aircraft.
Figure 2B:
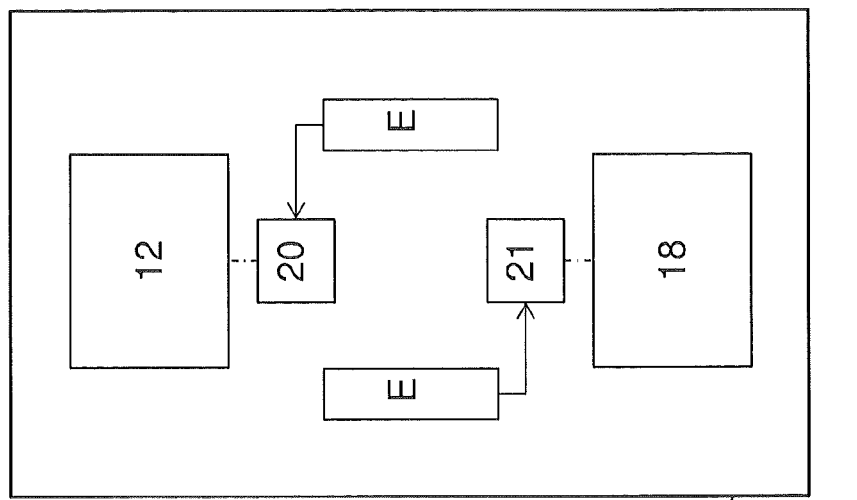
FIGS. 2a and 2b are exemplary schematic diagrams of the main rotor system and the tail rotor system of the aircraft of FIG. 1.

FIG. 1 schematically illustrates a rotary-wing aircraft 10 having a main rotor system 12. The aircraft 10 includes an airframe 14 having an extending tail 16 which mounts a tail rotor system 18, such as an anti-torque system, a translational thrust system, a pusher propeller, or a rotor propulsion system for example. Power is transferred from one or more engines E to a power transmission gearbox 20 (see FIGS. 2a and 2b), to drive the main rotor system 12 about a respective axis of rotation A. Although a particular rotary wing aircraft configuration is illustrated and described in the disclosed embodiment, other configurations and/or machines, such as a high speed compound rotary wing aircraft with supplemental translational thrust systems, a dual contra-rotating, coaxial rotor system aircraft, and a turbo-prop, tilt-rotor or tilt-wing aircraft for example, will also benefit from the present invention.

Figure 2A:
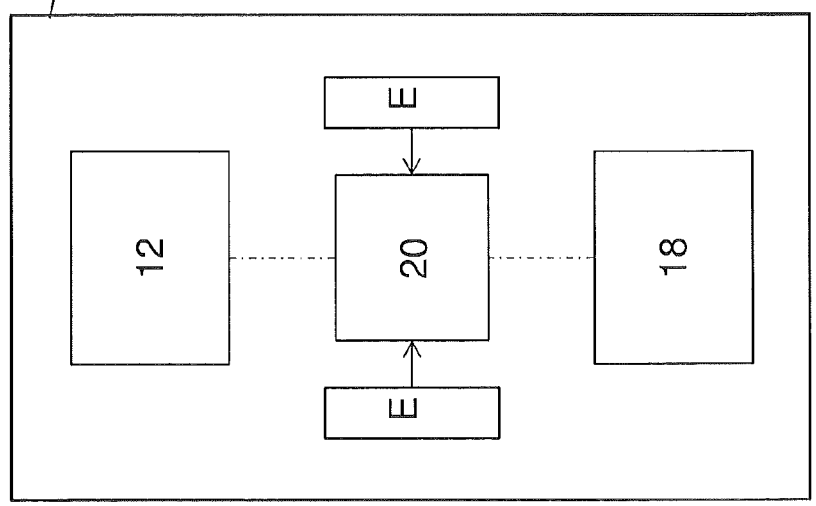

Referring now to FIG. 2a, a schematic diagram of the main rotor system 12 and the tail rotor system 18 of the aircraft 10 of FIG. 1 is provided in more detail. In the illustrated non-limiting embodiment, the power transmission gearbox 20 is interposed between one or more engines E, the main rotor system 12 and the tail rotor system 18. The gearbox 20 may be mechanically connected to and configured to operate both the main rotor system 12 and the tail rotor system 18. In another embodiment, shown in FIG. 2b, the rotary wing aircraft 10 includes a first power transmission gearbox 20 mechanically coupled to and configured to operate the main rotor system 12. Similarly, the second power transmission gearbox 21 is mechanically connected to and configured to operate the tail rotor system 18. Each of the power transmission gearboxes 20, 21 receives power from at least one engine E of the aircraft 10.

Figure 3:
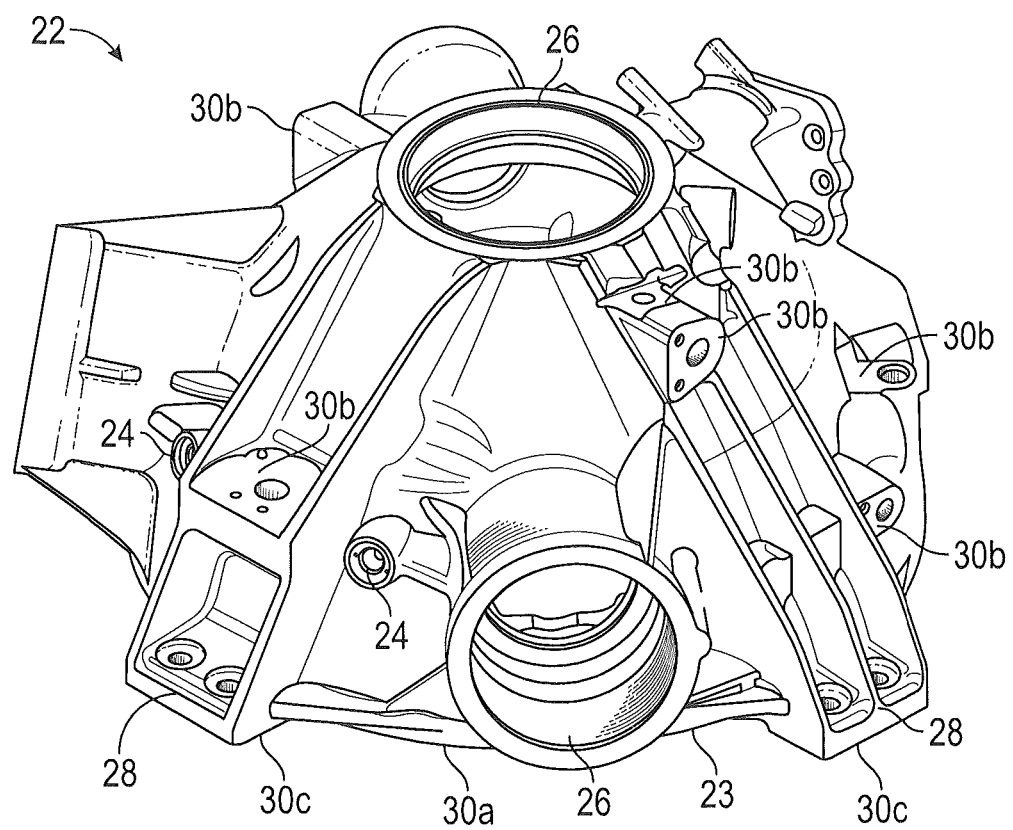
FIG. 3 is a perspective view of a gearbox housing of a rotary wing aircraft according to an embodiment of the invention.

The power transmission gearbox 20, 21 is generally mounted within a housing 22 configured to support the gear-train therein. In one embodiment, the housing includes either an aluminum or a magnesium material. The non-limiting embodiment of a housing 22, illustrated in FIG. 3 generally includes a plurality of first openings 24 configured to provide a plurality of passageways for a lubricant to various portions of the gearbox 20. The housing 22 may also include a plurality of second openings 26 configured to at least partially support an input module attachment (not shown), such as the rotor shaft (not shown) of the main rotor system 12 or the tail rotor system 18 for example. In addition, the housing 22 may include a plurality of mounting feet 28 arranged about the periphery thereof near a first end 23. Although a particular gearbox housing 22 configuration is illustrated and described in the disclosed non-limiting embodiment, other configurations are within the scope of the invention.

Figure 4:
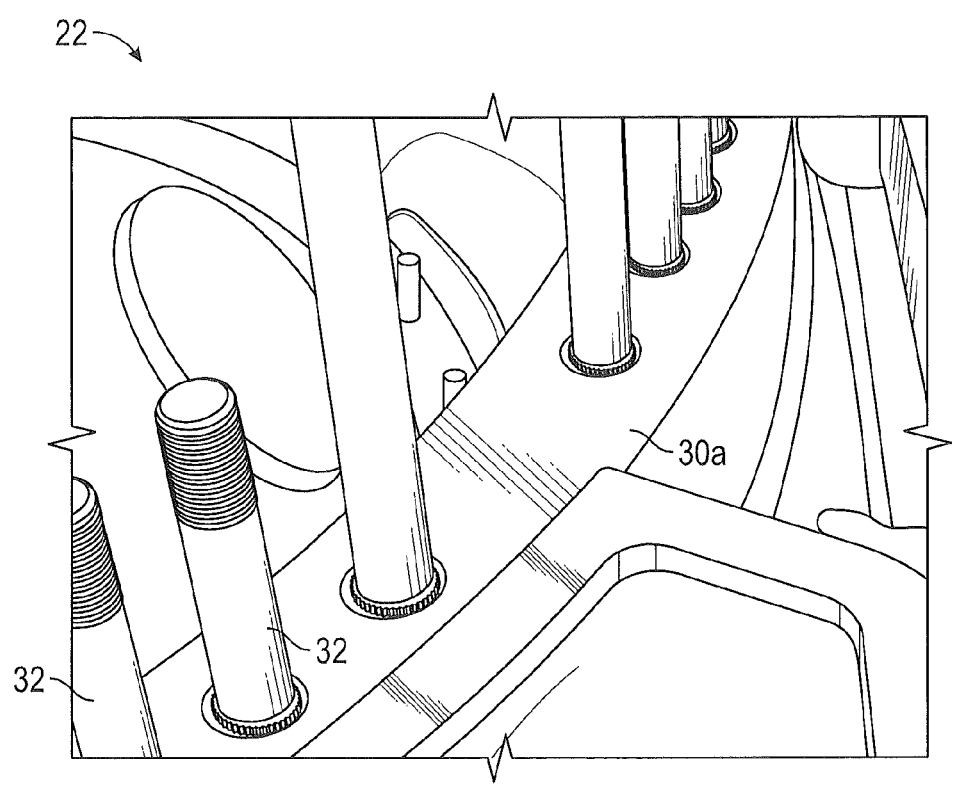
FIG. 4 is a perspective view of a mating surface of a gearbox housing of a rotary wing aircraft according to an embodiment of the invention.

The portions of the housing 22 that are most susceptible to damage, as well as corrosion and pitting are generally the surfaces 30 configured to contact or engage another component and/or a material distinguishable from the material of the housing 22. Exemplary surfaces 30 include, but are not limited to, end mating surface 30a, flight control surfaces 30b, and bottom surfaces 30c for example. The end mating surface 30a is located at the first end 23 of the housing 22 and is configured to engage a portion of the airframe 14 or another component of the aircraft 10. As illustrated in FIG. 4, at least one fastener 32 may extend generally perpendicularly from the end mating surface 30a, the at least one fastener 32 being configured to connect the first end 23 of the housing 22 to another portion of the aircraft 10. Each flight control surface 30b is configured to couple to a flight control or another component (not shown) of the aircraft 10. A plurality of flight control surfaces 30b may be disposed about the exterior of the housing 22 and may be arranged at any angle relative to the end mating surface 30a. Similarly, the bottom surfaces 30c are the portion of the mounting feet 28, such as the underside for example, configured to contact another component of the aircraft 10 or a portion of the airframe 14.

Figure 5:
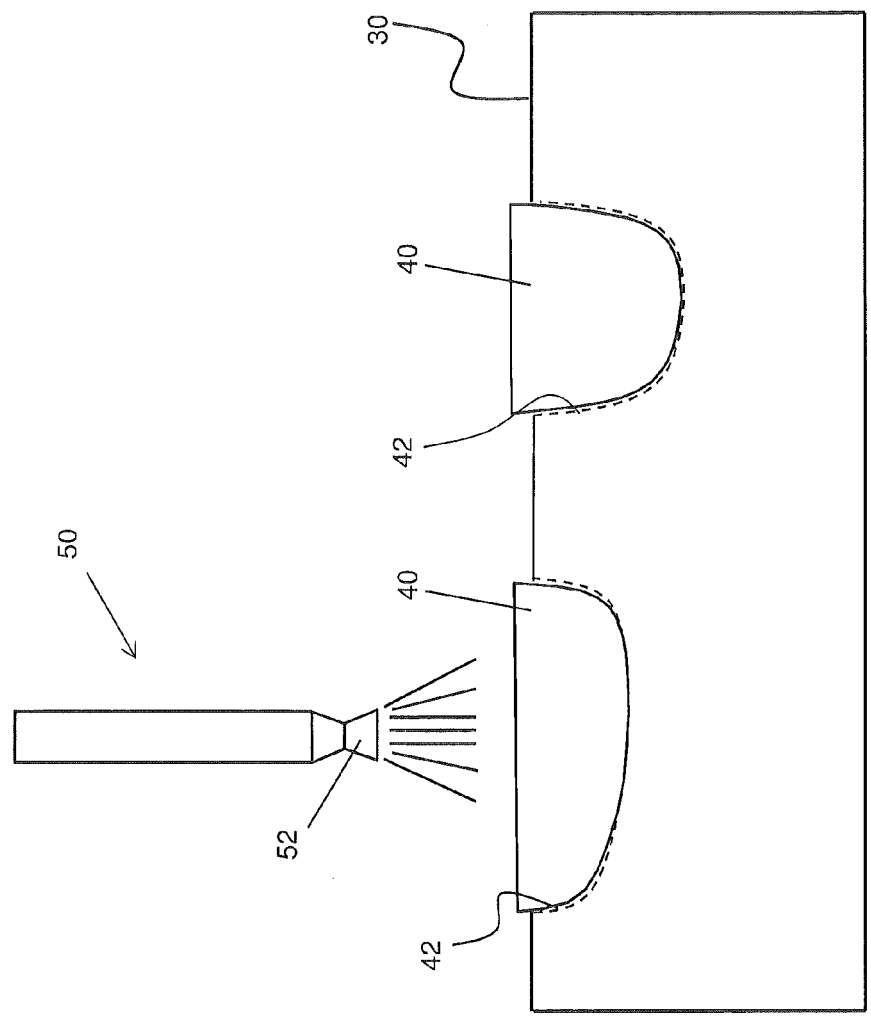
FIG. 5 is a cross-sectional view of a portion of a gearbox housing having an integrally formed structural deposit according to an embodiment of the invention.

Referring now to FIG. 5, a structural deposit 40 configured to support a load applied to the housing 22 is formed on at least a portion of a surface 30 of the gearbox housing 22 susceptible to corrosion and pitting. The structural deposit 40 may be formed from any suitable powdered material known in the art, such as aluminum or aluminum alloy for example. In one embodiment, the structural deposit 40 is formed as a means of repairing the housing 22 after either external damage (i.e. nicks, dings or gouges) or corrosion and/or pitting has already occurred. In another embodiment, the structural deposit 40 is formed as a "preemptive repair" based on a determination of where corrosion and pitting is most likely to occur.

A structural deposit 40 is formed by applying one or more layers of powdered material to an area 42 of the surface 30. In embodiments where the structural deposit 40 is applied after corrosion has occurred, each area 42 is created by removing as little of the material of the surface 30 as necessary to completely eliminate all of the localized corrosion and pitting. Some of the adjacent non-compromised material of the surface 30 may additionally be removed along with the localized corrosion and pitting to ensure that the remaining material of the housing 22 has not been compromised. In embodiments where the structural deposit 40 is applied "preemptively," each area 42 is created either by removing material from the surface 30 where corrosion and pitting are most likely to occur, or by depositing one or more layers of powdered material used to form a structural deposit 40 on top of the as-processed (or as-cast) surface. In either embodiment, the one or more areas 42 formed in the surface 30 are generally, but not limited to, concave grooves.

The one or more layers of powdered material used to form the structural deposit 40 are more substantial than a coating and are configured to share a load applied over the surface 30. As a result, the strength of a housing 22 having one or more structural deposits 40 integrally formed with the surfaces 30 where corrosion and pitting has/is likely to occur is near, substantially equal to, or in excess of the original strength of the housing 22. The structural deposit 40 formed from one or more layers of powdered material may have a thickness in the range of about 0.010 inches and 2.00 inches. In one embodiment, the structural deposit 40 has a thickness greater than or equal to 0.025 inches, depending on part geometry and other factors, to properly share the load applied to the component.

The layers of powdered material used to form the structural deposit 40 are generally applied through a deposition process that provides sufficient energy to accelerate the particles to a high enough velocity such that the particles plastically deform and bond to the area 42 upon impact. The particles of the powered material are accelerated through a converging/diverging nozzle 52 of a spray gun 50 to supersonic velocities using a pressurized or compressed gas, such as helium, nitrogen, other inert gases, or mixtures thereof. The deposition process does not metallurgically transform the particles from their solid state. Various techniques may be used to achieve this type of particle deposition, including but not limited to, cold spray deposition, kinetic metallization, electromagnetic particle acceleration, modified high velocity air fuel spraying, or high velocity impact fusion (HVIF) for example.

The layers of powered material may be applied to the original material of the housing 22, or alternatively, may be applied to a previously formed structural deposit 40. During deposition of the powdered material, the gearbox housing 22 may be held stationary or may be articulated or translated by any suitable means (not shown) known in the art. Alternatively, the nozzle 52, of the spray gun 50 may be held stationary or may be articulated or translated. In some instances, both the gearbox housing 22 and the nozzle 52 may be manipulated, either sequentially or simultaneously.

Figure 6:
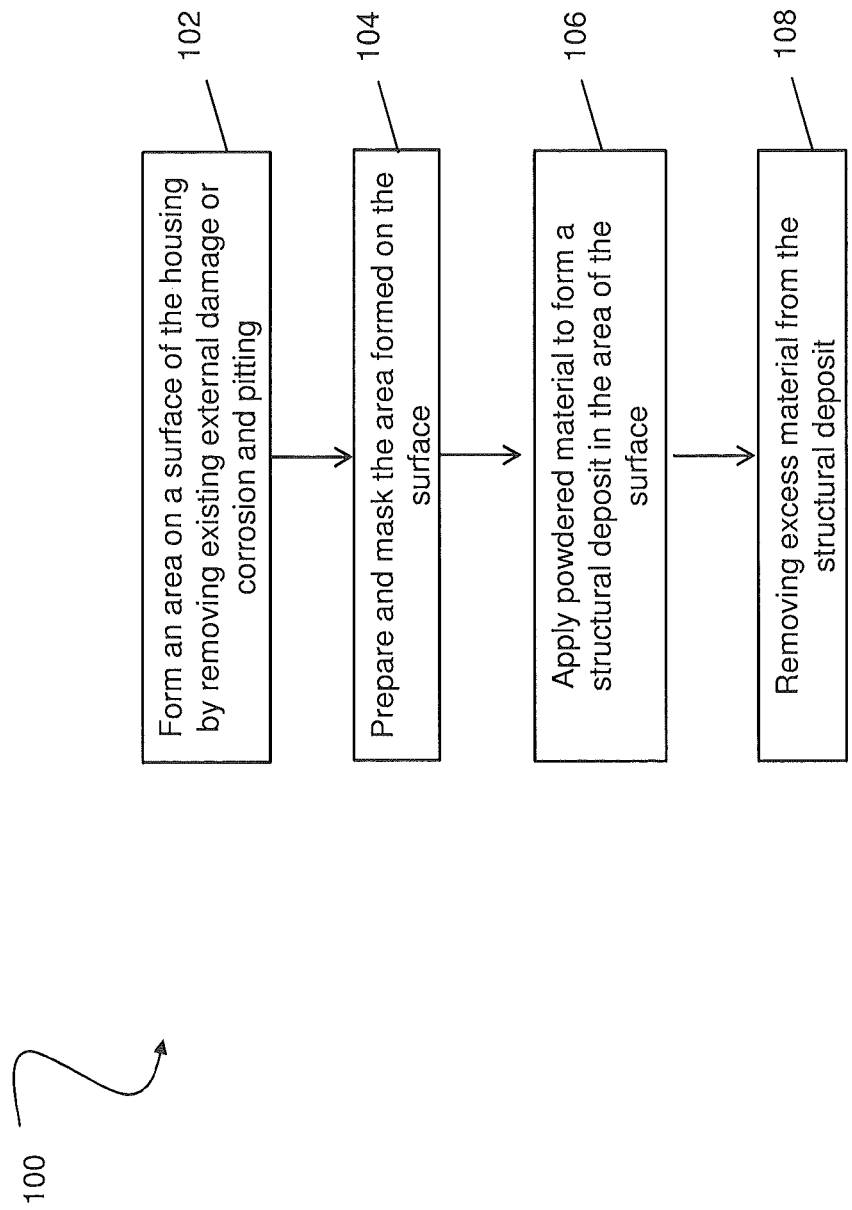
FIG. 6 is a method for rebuilding a portion of a surface of a gearbox housing according to an embodiment of the invention.

A method 100 for rebuilding a damaged or corroded portion of a surface 30 of a gearbox housing 22 is illustrated in FIG. 6. The surface 30 may be any of the surfaces 30a, 30b, 30c previously described. The method begins in block 102 by removing all of the localized damage or corrosion from a portion of surface 30 to form an area 42 (see FIG. 5). The corrosion and pitting may be removed either mechanically or chemically, for example using grinding, machining, etching, or other applicable techniques. After the localized corrosion is removed, as shown in block 104, the surface 30 is prepared and masked as is known in the art. In one embodiment, preparation and masking of the surface 30 involves the use of an abrasive grit blast. An additional material may be used to eliminate any blast residue as a course of contamination prevention. In block 106, at least one layer of powdered material is applied to the area 42 using a cold spray deposition process to create a structural deposit 40 integrally formed with the material of the housing 22. The structural deposit 40 bonded to the area 42 may extend beyond the original dimension of the surface 30 of the gearbox housing 22. After formation of the structural deposit 40, excess material is removed as necessary, as shown in block 108. As a result, the structural deposit 40 is generally flush with the remainder of the surface 30 of the gearbox housing 22 and/or the dimension of the gearbox housing 22 including the structural deposit 40 is substantially equal to the original dimension thereof.

Figure 7:
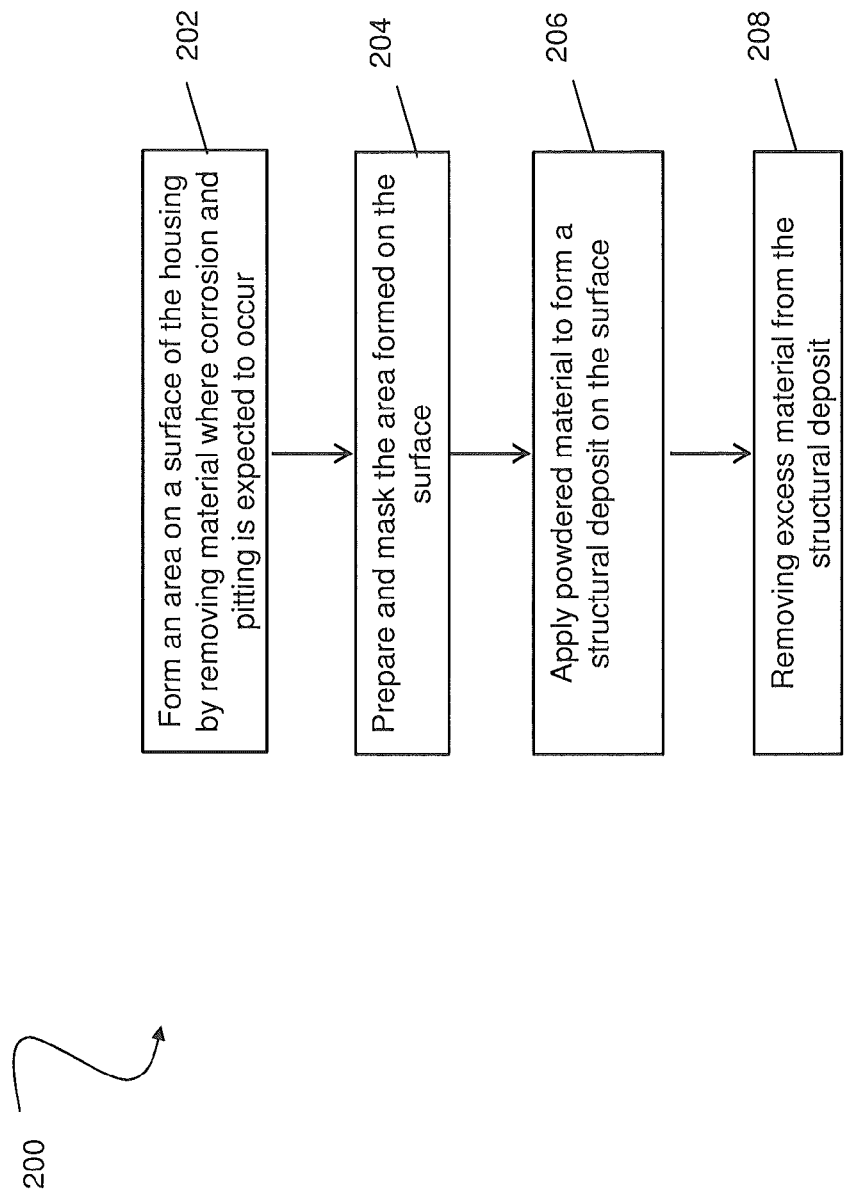
FIG. 7 is a method for preemptively forming a structural deposit in a surface of a gearbox housing according to an embodiment of the invention.

A method 200 of preemptively forming a structural deposit 40 in a surface 30 of a housing 22 is illustrated in FIG. 7. The surface 30 may be any of the surfaces 30a, 30b, 30c previously described. The method 200 may begin in block 202 by removing some material from the surface 30 of an unused gearbox housing 22, at a position where localized corrosion and pitting is most likely to occur, to form an area 42. Material may be removed from the surface 30 either mechanically or chemically, for example using grinding, machining, etching, or other applicable techniques. In embodiments where a structural deposit 40 is being added to the existing surface of the housing 22 without first removing any material, the step illustrated in block 202 may be skipped. In block 204, the portion of the surface 30 configured to receive the structural deposit 40, such as area 42 for example, is prepared and masked, as previously discussed. In block 206, at least one layer of powdered material is applied using a cold spray deposition process to form a structural deposit 40. The structural deposit 40 bonded to the surface 30 may extend beyond a desired dimension, such as the original dimension of the surface 30 of the gearbox housing 22 for example. In such instances, excess material is removed after formation of the structural deposit 40, as shown in block 208. The excess material 40 may be removed so that the structural deposit 40 is generally flush with the remainder of the surface 30 of the gearbox housing 22 so that the dimension of the gearbox housing 22 including the structural deposit 40 is substantially equal to the original dimension thereof.

Formation of one or more structural deposits 40 in the surfaces of a gearbox housing 22 can reduce and/or prevent corrosion and pitting, thereby improving the life of the housing 22. In addition, because the structural deposits 40 are configured to share the load applied to the surface 30, inclusion of one or more structural deposits 40 does not affect or minimally decreases the structural integrity of the housing 22.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of rebuilding a damaged portion of a surface of a gearbox housing, the surface configured to engage with and support a load of a portion of an aircraft, the method comprising:
   forming an area in the surface by removing all material exhibiting at least one of localized damage, corrosion and pitting;
   preparing the area;
   creating a structural deposit in the area, the structural deposit being integrally formed with the gearbox housing, and the structural deposit configured to share the load applied to the gearbox housing by the portion of the aircraft; and
   removing excess material from the structural deposit.

2. The method according to claim 1, wherein the gearbox housing is configured for a rotary wing aircraft and the portion of the aircraft is a portion of the rotary wing aircraft.

3. The method according to claim 1, wherein the structural deposit includes one or more layers of powdered material applied to the area through a cold spray deposition process.

4. The method according to claim 3, wherein the powdered material includes aluminum.

5. The method according to claim 1, wherein the excess material is removed so that the structural deposit is substantially flush with the surface.

6. The method according to claim 1, wherein the excess material is removed so that a dimension of the component including the structural deposit is substantially equal to an original dimension of the component.

7. A method of preemptively forming a structural deposit on a non-corroded surface of a first component, the surface configured to engage with and support a load of a second component, the method, comprising the steps of:
   selecting an unused gearbox housing as the first component;
   identifying a portion of the non-corroded surface of the gearbox housing where at least one of corrosion and pitting is expected to occur;
   removing material from the portion of the non-corroded surface of the gearbox housing;
   preparing the portion of the surface;
   creating a structural deposit on the portion of the surface identified where at least one of corrosion and pitting is expected to occur, the structural deposit being integrally formed with the first component, and the structural deposit configured to share the load applied to the first component; and
   removing excess material from the structural deposit.

8. The method according to claim 7, wherein selecting the gearbox housing includes selecting a gearbox housing of a rotary wing aircraft.

9. The method according to claim 7, wherein the structural deposit includes one or more layers of powdered material applied through a cold spray deposition process.

10. The method according to claim 9, wherein the powdered material includes aluminum.

11. The method according to claim 7, wherein the excess material is removed to achieve a desired dimension.

12. The method according to claim 11, wherein the desired dimension is substantially equal to an original dimension thereof.

13. The method according to claim 7, wherein the surface is one of a mating surface, a flight control surface, and a mounting foot portion, and the second component is one of a fastener, a flight control component, and an airframe.

14. A method of preemptively forming a structural deposit on a non-corroded surface of a first component, the surface configured to engage with and support a load of a second component, the method, comprising the steps of:
   selecting an unused gearbox housing as the first component;
   identifying a portion of the non-corroded surface of the gearbox housing where at least one of corrosion and pitting is expected to occur;

creating a structural deposit on the portion of the surface identified where at least one of corrosion and pitting is expected to occur by adding the structural deposit to the surface without first removing material from the portion of the surface, the structural deposit configured to share the load applied to the first component; and
removing excess material from the structural deposit.

* * * * *